(12) United States Patent
Kim et al.

(10) Patent No.: US 11,041,785 B2
(45) Date of Patent: Jun. 22, 2021

(54) APPARATUS FOR OBSERVING IMAGE OF LIVING TISSUE, METHOD FOR MANUFACTURING SAME, AND METHOD FOR OBSERVING IMAGE OF LIVING TISSUE USING SAME

(71) Applicant: KOREA RESEARCH INSTITUTE OF CHEMICAL TECHNOLOGY, Daejeon (KR)

(72) Inventors: Ki-Suk Kim, Daejeon (KR); Sun Hyun Park, Daejeon (KR); Dae-hwan Nam, Daegu (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 174 days.

(21) Appl. No.: 16/332,483

(22) PCT Filed: Jul. 31, 2018

(86) PCT No.: PCT/KR2018/008681
§ 371 (c)(1),
(2) Date: Mar. 12, 2019

(87) PCT Pub. No.: WO2019/039761
PCT Pub. Date: Feb. 28, 2019

(65) Prior Publication Data
US 2020/0393344 A1 Dec. 17, 2020

(30) Foreign Application Priority Data
Aug. 24, 2017 (KR) .......................... 10-2017-0107286

(51) Int. Cl.
*G01N 1/36* (2006.01)
*G01N 1/31* (2006.01)

(52) U.S. Cl.
CPC ............... *G01N 1/36* (2013.01); *G01N 1/312* (2013.01)

(58) Field of Classification Search
None
See application file for complete search history.

(56) References Cited

U.S. PATENT DOCUMENTS

| 2,328,246 A | 8/1943 | Albion |
| 2009/0023127 A1* | 1/2009 | Yu .......................... A01N 1/02 435/1.2 |

FOREIGN PATENT DOCUMENTS

| JP | H10501703 A | 2/1998 |
| JP | 3100179 B2 | 10/2000 |

(Continued)

OTHER PUBLICATIONS

International Search Report for Corresponding International Application No. PCT/KR2018/008681 (2 Pages) (dated Nov. 9, 2018).

*Primary Examiner* — Jyoti Nagpaul
(74) *Attorney, Agent, or Firm* — Lucas & Mercanti, LLP

(57) ABSTRACT

An apparatus for observing image of living tissue having a first cover slip and a second cover slip; and one or more chambers interposed between the first cover slip and the second cover slip and having a cavity therein; in order to observe a living tissue loaded in the cavity of the chamber above is provided.

The apparatus for observing image of living tissue of the present invention can be easily prepared with a simple process and a low cost, and facilitates the observation of images of living tissues on both sides, so that an entire image of a huge living tissue at the level of several hundred micrometers can be obtained by using a tissue transparency technique, which is a distinguished advantage of the apparatus of the invention. In the apparatus of the invention, the outer wall part forming the chamber is strongly bound so (Continued)

that the leakage of the mounting solution and the bubble generation can be prevented, indicating the damage of the living tissue can also be prevented.

5 Claims, 5 Drawing Sheets

(56) References Cited

FOREIGN PATENT DOCUMENTS

| | | |
|---|---|---|
| JP | 2001-515211 A | 9/2001 |
| JP | 2004-212361 A | 7/2004 |
| JP | 2008-515457 A | 5/2008 |
| JP | 2009162648 A | 7/2009 |
| JP | 2013039103 A | 2/2013 |
| KR | 10-1990-0701215 A | 12/1990 |
| KR | 10-1689879 B1 | 12/2016 |

* cited by examiner

APPARATUS FOR OBSERVING IMAGE OF LIVING TISSUE, METHOD FOR MANUFACTURING SAME, AND METHOD FOR OBSERVING IMAGE OF LIVING TISSUE USING SAME

CROSS REFERENCE TO RELATED APPLICATIONS

This application is a 371 of PCT/KR2018/008681, filed Jul. 31, 2018 which claims the benefit of Korean Patent Application No. 10-2017-0107286, filed Aug. 24, 2017, the contents of each of which are incorporated herein by reference.

BACKGROUND OF THE INVENTION

1. Field of the Invention

The present invention relates to an apparatus for observing image of living tissue, a method of preparing thereof, and a method for observing image of living tissue using the same.

2. Description of the Related Art

The medical diagnosis technique through x-ray has been developed to a very accurate diagnosis method with the processes of two-dimensional scanning such as CT or MRI and then reconstructing the scanned image into three-dimensional image for three-dimensional observation. A technique for realizing three-dimensional image by using not only light source but also ultrasound is actively used for diagnosis. However, most of the recent techniques have the micro resolution at the at the millimeter level, suggesting that they cannot satisfy the three-dimensional observation at the micro level that enables the analysis at the cell level. Most cell-level analyzes currently use traditional 2D techniques. Thus, most of cell level analysis today depends on the traditional two-dimensional method. That is, living tissues such as biopsy or autopsy tissues are fixed with a fixative, and then embedded with paraffin or polymer. The sample is cut into sections in the thickness of several micrometers or nanometers so that light or electromagnetic wave can pass through. Then, the microstructure is analyzed by observing the transmitted image with an optical or electron microscope.

To obtain three-dimensional image by using such a micro imaging technique, a confocal microscope is needed. In that case, thickness information at the level of tens of micrometers can be obtained. Approximately, the thickness is limited by the depth at which the light source can penetrate. Most of the significant structures in living tissues are in the size of at least several hundreds of micrometers, so that only a part of the information can be obtained by the conventional method above. Therefore, in order to obtain the image of a thicker tissue, a series of sections in the thickness of tens of micrometers need to be prepared sequentially, followed by imaging with a microscope for each section and reconstructing thereof. In particular, for imaging a whole neuron in the brain tissue, there are problems in the process of tissue-cutting and re-constructing them because one neuron can stretch its axon up to a few meters.

A tissue transparency technique is a technique that can investigate the internal structure and protein distribution in tissue without damaging the tissue. Therefore, the advancement of the tissue transparency technique has been made in many ways to observe the tissue structure more deeply with overcoming the limitation of the conventional method and to approach the integral information on structure and molecules from various systems. However, in spite of the advancement of the method above, a proper chamber to contain a transparent large sample for imaging has not been developed, yet. As shown in FIG. 5, the conventional method requires a lot of materials and processes, and only skilled researchers can perform mounting the tissues without damaging. In addition, the price of the materials is expensive.

Thus, the present inventors developed a chamber for observing images of a transparent large living tissue and further confirmed that the method of preparing the chamber according to the present invention is simple and the chamber is good enough to prevent the leakage of the mounting solution and the generation of bubbles, leading to the completion of the present invention.

In relation to the above, Korean Patent No. 10-1689879 describes a window apparatus for obtaining micro-images of a breast tissue in vivo and a method for obtaining the images using the same.

SUMMARY OF THE INVENTION

It is an object of the present invention to provide an apparatus for observing bio-tissue image, a method for preparing the apparatus for observing bio-tissue image, and a method for observing bio-tissue by using the apparatus above.

To achieve the above object, the present invention provides an apparatus for observing image of living tissue comprising a first cover slip and a second cover slip; and one or more chambers interposed between the first cover slip and the second cover slip and having a cavity therein; in order to observe a living tissue loaded in the cavity of the chamber above.

The present invention also provides a method of preparing the apparatus for observing image of living tissue comprising the following steps:

attaching at least one first outer wall to the first cover slip and at least one second outer wall to the second cover slip, respectively (step 1); and coupling the first outer wall and the second outer wall attached to the cover slips each other (step 2).

The present invention also provides a method for observing image of living tissue using the apparatus for observing image of living tissue above.

In addition, the present invention provides a kit for observing image of living tissue comprising the apparatus for observing image of living tissue above and a mounting solution.

ADVANTAGEOUS EFFECT

The apparatus for observing image of living tissue of the present invention can be easily prepared with a simple process and a low cost, and facilitates the observation of images of living tissues on both sides, so that an entire image of a huge living tissue at the level of several hundred micrometers can be obtained by using a tissue transparency technique, which is a distinguished advantage of the apparatus of the invention. In the apparatus of the invention, the outer wall part forming the chamber is strongly bound so that the leakage of the mounting solution and the bubble generation can be prevented, indicating the damage of the living tissue can also be prevented.

DESCRIPTION OF THE PREFERRED EMBODIMENTS

The present invention provides an apparatus for observing image of living tissue comprising a first cover slip and a second cover slip; and one or more chambers interposed between the first cover slip and the second cover slip and having a cavity therein; in order to observe a living tissue loaded in the cavity of the chamber above.

Hereinafter, the apparatus for observing image of living tissue according to the present invention is described in detail with reference to FIG. 1 and FIG. 2.

Figure 3:
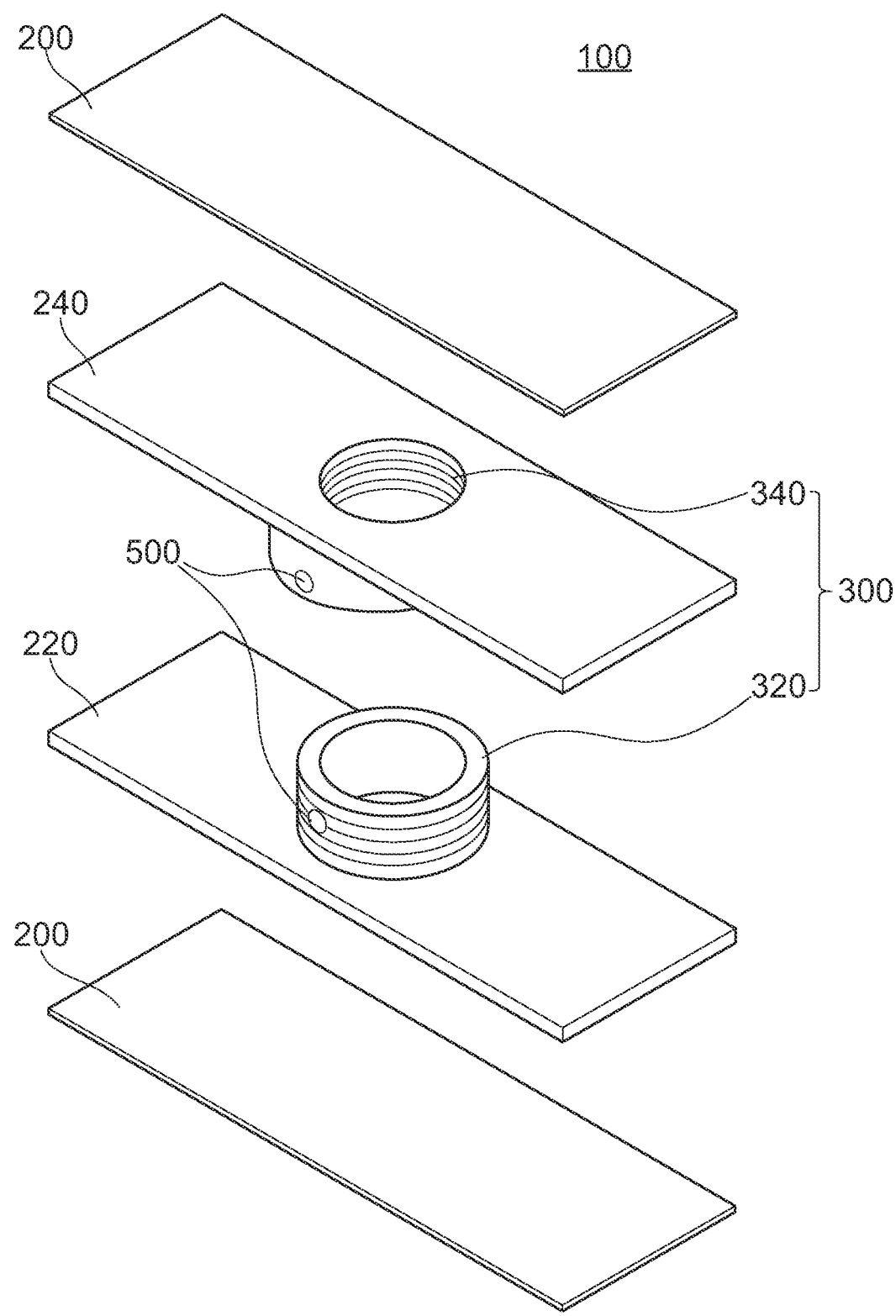
FIG. 3 and FIG. 4 are diagrams illustrating the separated view of each configuration of the apparatus for observing image of living tissue according to an embodiment of the present invention.

According to the prior art, since there was no appropriate apparatus for observing image of living tissue, a silicon chamber was prepared as shown in FIG. 3 and the cover slip was attached to the both upper and lower sides of the prepared silicon chamber. Then, living tissues were loaded in the chamber, followed by image recording. However, the conventional method above has some problems that it is difficult to mount living tissues without damaging the living tissues and the chamber, and the material is expensive. On the other hand, the apparatus for observing image of living tissue of the present invention is economical and efficient since the preparation method thereof is simple and the large living tissue can be easily mounted.

Figure 1:
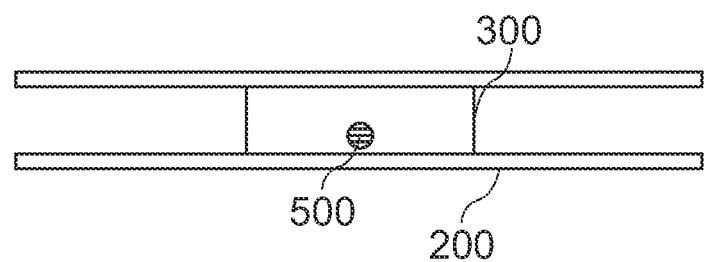
FIG. 1 and FIG. 2 are diagrams illustrating the apparatus for observing image of living tissue according to an embodiment of the present invention.
Figure 2:
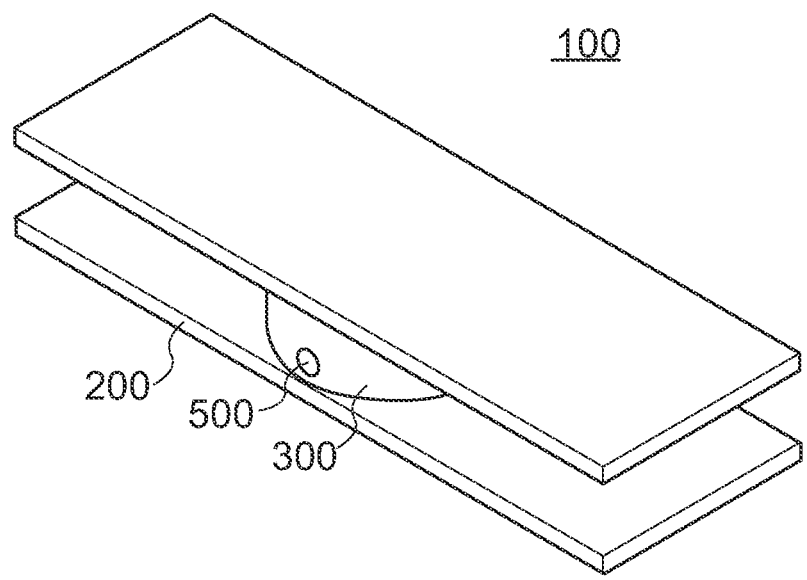

FIG. 1 and FIG. 2 are diagrams illustrating the apparatus for observing image of living tissue (100) according to an embodiment of the present invention. The diagrams above correspond to an embodiment of the present invention and cannot limit the scope and spirit of the present invention.

As shown in FIG. 1 and FIG. 2, the apparatus for observing image of living tissue (100) according to an embodiment of the present invention is composed of a first cover slip and a second cover slip (200); and one or more chambers (300) interposed between the first cover slip and the second cover slip (200) and having a cavity therein.

In FIG. 1 and FIG. 2, the cover slip (200) is presented in the form of a rectangle, but the shape is not limited. For example, various shapes such as a circle, a triangle, and a pentagon are possible.

The size of the cover slip (200) above can be approximately 10 mm to 150 mm, but not always limited thereto. The size of the cover slip (200) means different from the shape. For example, if the cover slip is in the form of a circle, the size means the diameter of the circle. If the cover slip is in the shape of an oval, the size means the diameter of a major axis or a minor axis. If the cover slip is in the form of a polygon, the size means the diameter of one side.

The cover slip (200) above can be in the regular size which has been accepted generally these days. Only the bottom part where the sample enters is made thin in order to make the observation range of the microscope lens wide and both the upper and lower sides are constructed as same so that any part can be observed.

The chamber (300) above comprises an outer wall part and a cavity. The outer wall part comprises a first outer wall attached to the first cover slip and a second outer wall attached to the second cover slip, and at this time the first outer wall and the second outer wall are coupled together to form a cavity therein.

At this time, the coupling can be accomplished in many manners, and the first outer wall and the second outer wall must be coupled together without any leakage space. This means that when the living tissue and the mounting solution are injected into the cavity formed in both outer walls, the living tissue should not leak to the outside.

Figure 4:
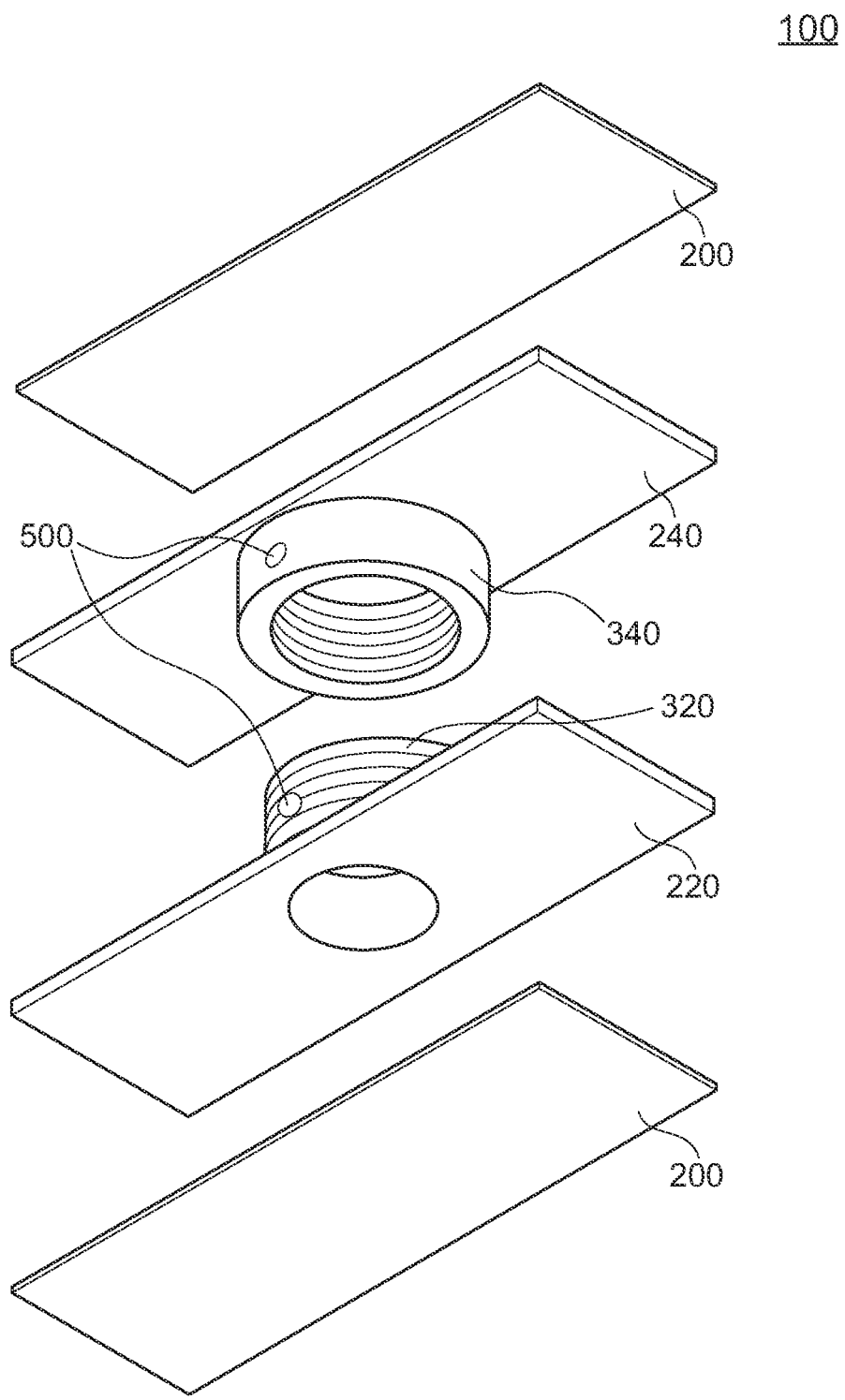
Figure 5:
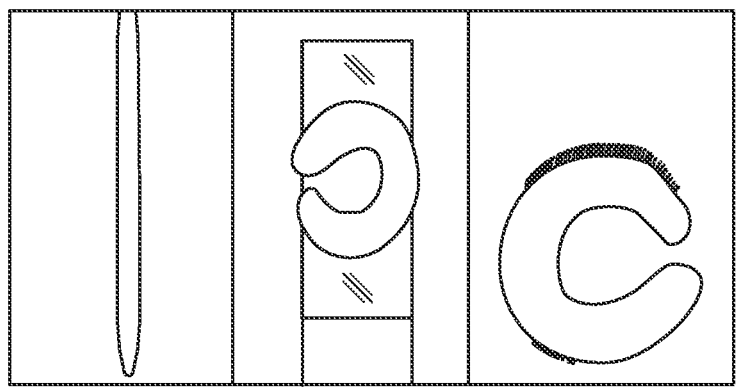
FIG. 5 is a set of illustration of the conventional apparatus for observing image of living tissue according to a comparative example of the present invention.
Figure 5:
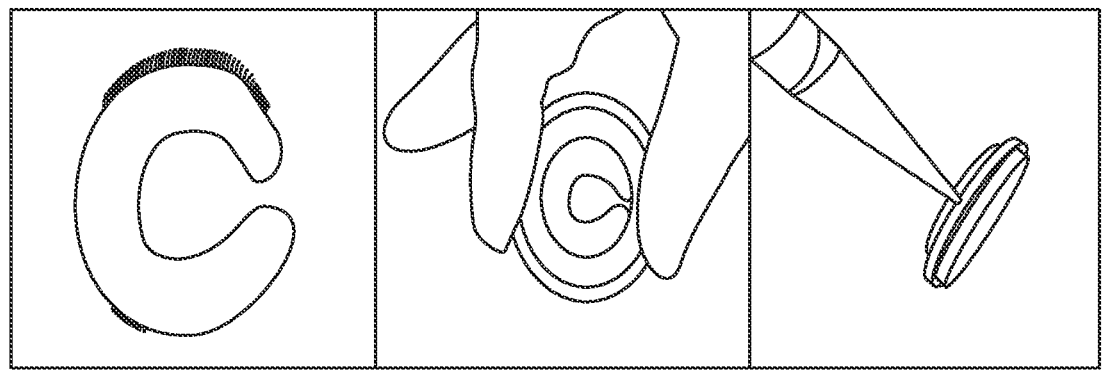
Figure 5:
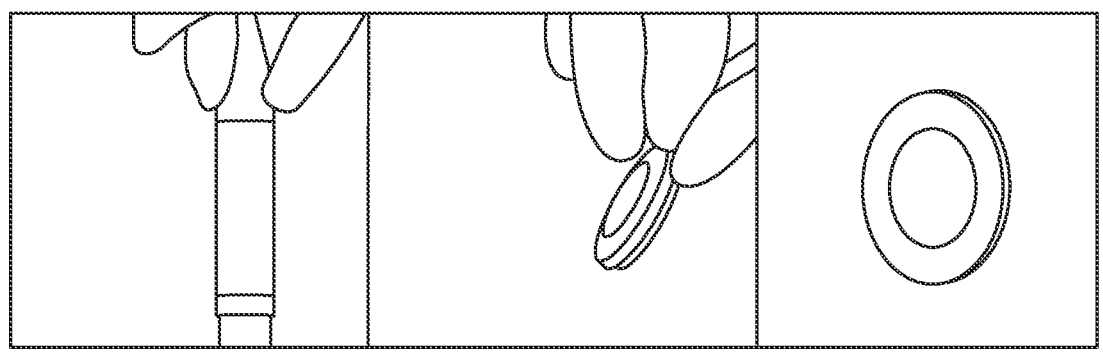

For example, as shown in FIG. 3 and FIG. 4, the coupling can be accomplished by a screw method, can be accomplished using an O-ring, and can be accomplished using a groove, but not always limited thereto and anything that can make the coupling tight without leakage from the walls can be used.

As shown in FIG. 3 and FIG. 4, if the coupling is accomplished by a screw method, the first outer wall and the second outer wall can include the regions (220, 240) attached to the cover slip (200), the protrusion part (320) and the groove part (340). At this time, the first outer wall and the second outer wall can each include the protrusion part and the groove part.

Therefore, when the first outer wall and the second outer wall are coupled, the first outer wall may be in contact with the inner of the second outer wall.

The first outer wall and the second outer wall can be separated from each other. Since both walls can be coupled and separated, they can be recycled. Precisely, the walls are coupled for the observation of living tissue image, and they are separated from each other after the observation and the living tissue finished with the observation is discarded. The separated walls can be coupled again for the observation of another living tissue.

In the meantime, the first outer wall and the second outer wall can contain one or more openings (500) passing through the outer wall.

The shape of the opening (500) is not limited. As shown in FIG. 3 and FIG. 4, when the first outer wall and the second outer wall are coupled together by a screw method, the outer walls are brought into contact with each other and rotated to form a strong coupling. At this time, the openings (500) formed in each of the first outer wall and the second outer wall meet each other to form a penetrating spot before the coupling is completed. The living tissue and the mounting solution are loaded in the chamber through the openings (500). After the loading, the outer walls are rotated and coupled each other more strongly, and then the openings (500) in the first outer wall and the second outer wall do not penetrate each other, so that the living tissue and the mounting solution loaded in the chamber are not leaked to the outside of the chamber.

In the process of injecting the living tissue and the mounting solution, the openings (500) formed in the first outer wall and in the second outer wall are aligned to penetrate each other. Then, the coincided openings (500) are placed in the upward direction. By further rotating the outer walls after the injection, leakage of the mounting solution and bubble generation are prevented.

In addition, the apparatus can include multiple openings (500), that is additional openings (500) can be included to release air from the inside of the cavity, in addition to the openings (500) for injecting the living tissue and the mounting solution.

The protrusion part of the chamber above, except the part that is attached to the cover slips, can be in various forms, for example, a screw, a cylinder, a triangular column, a square column, a pentagonal column or a hexagonal column, but not always limited thereto.

In the first outer wall and the second outer wall, the size of the part other than the part to which the cover slip is attached can be about 5 mm to about 30 mm, but not always limited thereto. The size refers to the size of the surface of the part attached to the cover slips, and the size can vary depending on the shape. For example, if the protrusion part is in the form of a cylinder, the size indicates the diameter of the circle, and if the protrusion part is in the form of an oval, the size means the diameter of a major axis or a minor axis. If the protrusion part is in the form of a polygonal column, the size means the diameter of one side.

In the first outer all and the second outer wall, the height of the protrusion part can be approximately 3 mm to mm, but not always limited thereto. If the height is higher than the range above, the light refractive index of the microscope lens can be affected. However, if the sample is a huge tissue having a height that can be measured by a microscope, the protrusion part can be prepared with a height higher than the range above, but not always limited thereto.

The material of the first outer wall and the second outer wall can be any material as long as it can protect the structure inside of the chamber and not be damaged by the mounting solution, which is exemplified by acrylic resin, but not always limited thereto.

The configurations of the apparatus for observing image of living tissue of the present invention (100) are schematically shown in FIG. 3 and FIG. 4.

Particularly, the apparatus above comprises a first cover slip and a second cover slip (200), and a first outer wall attached to the first cover slip and a second outer wall attached to the second cover slip. At this time, the first outer wall and the second outer wall include the regions (220, 240) attached to the cover slip, the protrusion part and the groove part (320, 340), wherein the protrusion parts are connected each other.

The present invention also provides a method of preparing the apparatus for observing image of living tissue comprising the following steps:

attaching at least one first outer wall to the first cover slip and at least one second outer wall to the second cover slip, respectively (step 1); and coupling the first outer wall and the second outer wall attached to the cover slips each other (step 2).

Hereinafter, the method of preparing the apparatus for observing image of living tissue of the present invention is described in more detail step by step.

First, step 1 is to attach at least one first outer wall to the first cover slip and at least one second outer wall to the second cover slip, respectively.

At this time, the attachment can be performed by any informed methods. For example, a method using an adhesive material such as instant adhesive and acrylic bond can be used, but not always limited thereto.

The shape of the cover slip is not limited. For example, various shapes such as a circle, a triangle, a square and a pentagon are possible.

The size of the cover slip above can be approximately 10 mm to 150 mm, but not always limited thereto. The size of the cover slip means different from the shape. For example, if the cover slip is in the form of a circle, the size means the diameter of the circle. If the cover slip is in the shape of an oval, the size means the diameter of a major axis or a minor axis. If the cover slip is in the form of a polygon, the size means the diameter of one side.

In the meantime, the first outer wall and the second outer wall can include the regions attached to the cover slip and the protrusion part. The protrusion part can be in various forms, for example, a screw, a cylinder, a triangular column, a square column, a pentagonal column or a hexagonal column, but not always limited thereto.

In the first outer wall and the second outer wall, the size of the part other than the part to which the cover slip is attached can be about 5 mm to about 30 mm, but not always limited thereto. The size refers to the size of the surface of the part attached to the cover slips, and the size can vary depending on the shape. For example, if the protrusion part is in the form of a cylinder, the size indicates the diameter of the circle, and if the protrusion part is in the form of an oval, the size means the diameter of a major axis or a minor axis. If the protrusion part is in the form of a polygonal column, the size means the diameter of one side.

In the first outer all and the second outer wall, the height of the protrusion part can be approximately 3 mm to 20 mm, but not always limited thereto.

The material of the first outer wall and the second outer wall can be any material as long as it can protect the structure inside of the chamber and not be damaged by the mounting solution, which is exemplified by acrylic resin, but not always limited thereto.

Next, step 2 is to couple the first outer wall and the second outer wall attached to the cover slips each other.

At this time, the coupling can be accomplished in many manners, and the first outer wall and the second outer wall must be coupled together without any leakage space. This means that when the living tissue and the mounting solution are injected into the cavity formed in both outer walls, the living tissue should not leak to the outside.

For example, as shown in FIG. 2, the coupling can be accomplished by a screw method, can be accomplished using an O-ring, and can be accomplished using a groove, but not always limited thereto and anything that can make the couple tight without leakage from the walls can be used.

As shown in FIG. 3 and FIG. 4, if the coupling is accomplished by a screw method, the first outer wall and the second outer wall can include the regions (220, 240) attached to the cover slip (200), the protrusion part (320) and the groove part (340). At this time, the first outer wall and the second outer wall can each include the protrusion part and the groove part.

When the first outer wall is coupled to the second outer wall, it can be in the shape that the first outer wall is located in the inside of the second outer wall and attached thereto.

The first outer wall and the second outer wall can be separated from each other. Since both walls can be coupled and separated, they can be recycled. Precisely, the walls are coupled for the observation of living tissue image, and they are separated from each other after the observation and the living tissue finished with the observation is discarded. The separated walls can be coupled again for the observation of another living tissue.

In the meantime, the first outer wall and the second outer wall can contain one or more openings (500) passing through the outer wall.

The shape of the opening (500) is not limited. As shown in FIG. 3 and FIG. 4, when the first outer wall and the second outer wall are coupled together by a screw method, the outer walls are brought into contact with each other and rotated to form a strong coupling. At this time, the openings (500) formed in each of the first outer wall and the second outer wall meet each other to form a penetrating spot before the coupling is completed. The living tissue and the mounting solution are loaded in the chamber through the openings (500). After the loading, the outer walls are rotated and coupled each other more strongly, and then the openings (500) in the first outer wall and the second outer wall do not penetrate each other, so that the living tissue and the mounting solution loaded in the chamber are not leaked to the outside of the chamber.

In the process of injecting the living tissue and the mounting solution, the openings (500) formed in the first outer wall and in the second outer wall are aligned to penetrate each other. Then, the coincided openings (500) are placed in the upward direction. By further rotating the outer walls after the injection, leakage of the mounting solution and bubble generation are prevented.

In addition, the apparatus can include multiple openings (500), that is additional openings (500) can be included to release air from the inside of the cavity, in addition to the openings (500) for injecting the living tissue and the mounting solution.

The present invention also provides a method for observing image of living tissue using the apparatus for observing image of living tissue above.

The observation of the living tissue image can be performed on the cover slip by using an optical microscope or an electron microscope, but not always limited thereto. In this invention, the apparatus for observing image of living tissue contains cover slips on both sides, so that the living tissue injected in the chamber can be observed from both sides, indicating that the living tissue having a maximum size of about 10 µm to about 1.5 cm can be observed.

That is, the apparatus of the present invention facilitates the observation of images of the both sides of a large sized living tissue so that the information on the entire living tissue can be obtained and analyzed.

In addition, the present invention provides a kit for observing image of living tissue comprising the apparatus for observing image of living tissue above and a mounting solution.

The apparatus for observing image of living tissue is as described above.

In the meantime, the mounting solution is used for observing a living tissue more clearly under a microscope, which can be a commonly used mounting solution herein, but not always limited thereto.

Preferably, the mounting solution can be a solution capable of regulating the size of a living tissue, and the mounting solution capable of regulating the size of a living tissue is described in more detail hereinafter.

The mounting solution that can regulate the size of a living tissue can include a compound represented by formula 1 below, an optical isomer thereof, a hydrate thereof, or a salt thereof and an alkali metal halide.

[Formula 1]

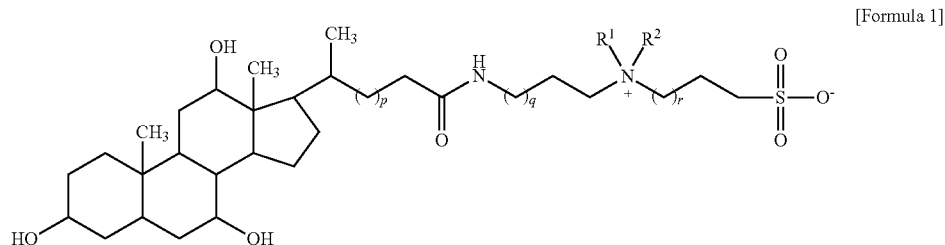

In formula 1,
R$^1$ and R$^2$ are independently C1-10 straight or branched alkyl; and
p, q and r are independently an integer of 0~10.
Preferably,
R$^1$ and R$^2$ are independently C1-5 straight or branched alkyl; and
p, q and r are independently an integer of 0~5.
More preferably,
R$^1$ and R$^2$ are methyl; and
p, q and r are an integer of 1.
Most preferably,
the compound represented by formula 1 is a compound represented by the following formula 2 or a hydrate thereof.

[Formula 2]

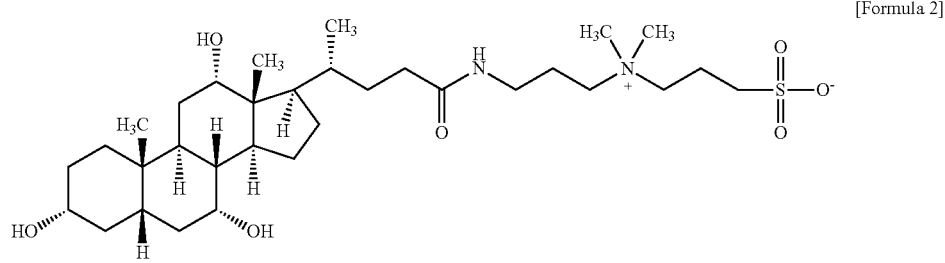

Hereinafter, a composition for regulating the size of a living tissue is described in more detail.

The composition for regulating the size of a living tissue can regulate the size of the living tissue by controlling the content and concentration of each constituent.

In addition, the composition for regulating the size of a living tissue is used for easily observing a living tissue with a microscope and at this time, the living tissue can be a transparent living tissue.

The composition for transparency of a living tissue used to obtain the transparent living tissue can be a composition conventionally used. Preferably, the composition for transparency of a living tissue can include a compound represented by formula 1. At this time, the concentration of the compound represented by formula 1 can be 2-55 w/v % (weight/volume %) and more preferably 20-50 w/v %. A solution used to indicate the concentration can be a simulated body fluid generally used in this field and is more preferably exemplified by distilled water, PBS (phosphate buffer saline) and TBS (tris buffer solution), but not always limited thereto. If the concentration of the compound represented by formula 1 above is less than 2 w/v %, the process of transparency of a living tissue would be significantly slowed. In the meantime, if the concentration of the compound is more than 55 w/v %, CHAPS represented by formula 1 above might not be completely dissolved.

Further, the composition for transparency of a living tissue above can additionally include a substance that plays a role in rapidly promoting transparency of a living tissue by controlling osmotic pressure. At this time, the substance rapidly promoting transparency of a living tissue is exemplified by urea, CHAPSO (3-([3-Cholamidopropyl]dimethylammonio)-2-hydroxy-1-propanesulfonate), sucrose, fructose, glycerol, diatrizoic acid, Triton X-100, Tween-20, 2,2'-thiodiethanol, iohexol, chloral hydrate or a combination thereof, but not always limited thereto.

At this time, the concentration of the substance rapidly promoting transparency of a living tissue can be 5-80 w/v %, 5-75 w/v %, 10-70 w/v %, 5-50 w/v %, or 35-60 w/v %. If the concentration is less than 5 w/v %, the rate of transparency of the living tissue would be slowed. On the other hand, if the concentration is more than 80 w/v %, crystals might be formed or dissolution would not be completed. As an example, if urea is used as the substance rapidly promoting transparency of a living tissue, the concentration of urea is preferably 10-70 w/v % and more preferably 20-60 w/v %. The concentration of such a substance rapidly promoting transparency of a living tissue can be properly regulated in relation to a preferable concentration of the compound represented by formula 1.

Once the living tissue is made transparent by the composition for transparency of a living tissue, the size of the living tissue can be regulated by using the composition for regulating the size of a living tissue.

The composition for regulating the size of a living tissue can include a compound represented by formula 1, an optical isomer thereof, a hydrate thereof, or a salt thereof and an alkali metal halide.

At this time, the composition can additionally include urea, CHAPSO (3-([3-Cholamidopropyl]dimethylammonio)-2-hydroxy-1-propanesulfonate), sucrose, fructose, glycerol, diatrizoic acid, Triton X-100, Tween-20, 2,2'-thiodiethanol, iohexol, chloral hydrate or a combination thereof. Preferably the composition can contain urea.

The composition for regulating the size of a living tissue above can additionally include a simulated body fluid. In the mixture comprising the composition for regulating the size of a living tissue and the simulated body fluid, the concentration of the compound represented by formula 1, the optical isomer thereof, the hydrate thereof, or the salt thereof can be 30-60 w/v %, and the concentration of the alkali metal halide can be 1-5 w/v %.

The alkali metal halide can be in the structure wherein an alkali metal is combined with a halogen element, and is preferably sodium chloride.

As described above, the composition for regulating the size of a living tissue can regulate the size of the transparent living tissue without damaging the tissue, and can be applied to various living tissues of brain, liver, lung, kidney, intestine, heart, muscle and blood vessel. In addition to that, the advantages of this composition are preventing swelling of tissue, bubble formation, discoloration and generation of black sediment and low costs, so that the composition above can be effectively used as a composition for regulating the size of a living tissue.

INDUSTRIAL APPLICABILITY

The apparatus for observing image of living tissue of the present invention can be easily prepared with a simple process and a low cost, and facilitates the observation of images of living tissues on both sides, so that an entire image of a huge living tissue at the level of several hundred micrometers can be obtained by using a tissue transparency technique, which is a distinguished advantage of the apparatus of the invention. In the apparatus of the invention, the outer wall part forming the chamber is strongly bound so that the leakage of the mounting solution and the bubble generation can be prevented, indicating the damage of the living tissue can also be prevented.

What is claimed is:

1. A kit for observing image of living tissue comprising an apparatus for observing image of living tissue and a mounting solution for regulating the size of a living tissue including a compound represented by Formula 1 below, an optical isomer thereof, a hydrate thereof, or a salt thereof and an alkali metal halide:

Formula 1

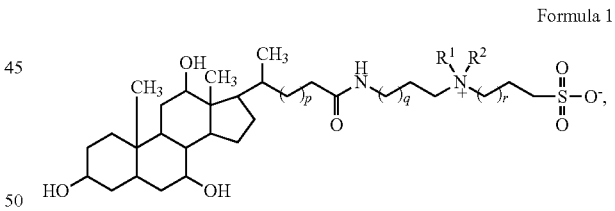

wherein
$R^1$ and $R^2$ are independently $C_{1-10}$ straight or branched alkyl;
p, q and r are independently an integer of 0-10; and
wherein the apparatus for observing image of living tissue comprises
a first cover slip and a second cover slip, and
one or more chamber(s) interposed between the first cover slip and the second cover slip and having a cavity therein,
in order to observe a living tissue loaded in the cavity of the chamber above,
wherein the chamber includes outer walls and the cavity, the outer walls include a first outer wall attached to the first cover slip and a second outer wall attached to the second cover slip, and the first outer wall and the second outer wall are coupled each other to form a cavity therein, wherein the first outer wall and the second outer wall respectively contain one or more opening(s) penetrating the outer wall, and wherein when the one or more opening(s) of the first outer wall and the one or more opening(s) of the second outer wall meet each other, a penetrating spot is formed and through which the mounting solution are loaded in the chamber, or when the one or more opening(s) of the first outer wall and the one or more opening(s) of the second outer wall do not meet each other, the penetrating spot is not formed and the mounting solution loaded in the chamber are not leaked to the outside of the chamber.

2. The kit for observing image of living tissue according to claim 1, wherein the first outer wall is in contact with the inner of the second outer wall to be coupled with the second outer wall.

3. The kit for observing image of living tissue according to claim 1, wherein the first outer wall and the second outer wall are coupled together by a screw method.

4. A method for observing image of living tissue using the kit for observing image of living tissue of claim 1.

5. The method for observing image of living tissue according to claim 4, wherein the observing image of living tissue is performed by using an optical microscope or an electron microscope.

* * * * *